United States Patent [19]

Suzuki

[11] Patent Number: 4,660,269
[45] Date of Patent: Apr. 28, 1987

[54] PROCESS FOR PRODUCING BUILT-UP CAMSHAFTS

[75] Inventor: Hideo Suzuki, Toyohashi, Japan

[73] Assignee: Musashi Seimitsu Kogyo Kabushiki Kaisha, Toyohashi, Japan

[21] Appl. No.: 862,096

[22] Filed: May 12, 1986

[30] Foreign Application Priority Data

May 21, 1985 [JP] Japan .................. 60-109086

[51] Int. Cl.⁴ .............. B21D 39/00; B21D 22/10; B23P 17/00; F16H 53/00
[52] U.S. Cl. .................. 29/523; 29/421 R; 72/61; 72/62; 74/567
[58] Field of Search ............ 72/58, 61, 62; 74/567; 29/523, 525, 421 R, 157.4 R, 166.4 R

[56] References Cited

U.S. PATENT DOCUMENTS

| | | | |
|---|---|---|---|
| 3,911,549 | 10/1975 | Herr | 29/421 R |
| 4,265,388 | 5/1981 | Takahashi et al. | 29/525 |
| 4,293,995 | 10/1981 | Jordan | 29/421 R |
| 4,597,365 | 7/1986 | Madaffer | 29/156.4 R |
| 4,612,695 | 9/1986 | Umeha et al. | 74/567 |
| 4,620,454 | 11/1986 | Sugiuchi et al. | 74/567 |

*Primary Examiner*—Howard N. Goldberg
*Assistant Examiner*—Steven Nichols
*Attorney, Agent, or Firm*—Ladas & Parry

[57] ABSTRACT

A built-up camshaft is fabricated by fitting cam disks on a hollow shaft, fitting shaft end caps over the ends of the hollow shaft, placing the resulting structure in a die, compressing the hollow shaft in the axial direction thereof inwardly from the opposite ends thereof thereby to carry out swaging tube expansion thereof to place all parts in a temporarily fixed state, and introducing a fluid under pressure into the hollow shaft thereby to carry out bulging and expansion of diameter at specific parts of the hollow shaft and obtain an integral built-up camshaft.

12 Claims, 12 Drawing Figures

PROCESS FOR PRODUCING BUILT-UP CAMSHAFTS

BACKGROUND OF THE INVENTION

This invention relates generally to camshafts of internal-combustion engines and more particularly to built-up camshafts of the type wherein a hollow structure such as a tube is used for the shaft, and separate structures such as cam parts and shaft end members are fixed securely to the shaft by a process such as bulging to obtain an integral built-up camshaft.

Built-up camshafts of the instant character produced by a bulging are known in the art, examples of which are disclosed in Japanese Utility Model Application Laid-Open Publication No. 124205/1981, and Utility Model Publication No. 966/1981. Furthermore, built-up camshafts in which shaft end members are attached to the ends of a hollow shaft are disclosed in publications such as Japanese Utility Model Application Laid-Open Publication Nos. 1704/1983 and 73914/1983.

Built-up camshafts have heretofore been produced by a process wherein, after cam plates or disks and a hollow shaft have been integrally joined by a bulging process, shaft end members are fitted onto the two ends of the hollow shaft, and, in order to prevent relative rotation and axial movement between the hollow shaft and the shaft end members, they have been fixed together by a measure such as welding or brazing. As a consequence, the required amount of labor is high, whereby the production is disadvantageously inefficient.

Furthermore, when the cam disks are fixed to the hollow shaft by a bulging process, specific bulges are formed in the hollow shaft, and the overall length of the hollow shaft becomes shorter. In this case, great deviations occur in the dimensions from the shaft ends to the adjacent cam disks between camshafts that have undergone the bulging process. Accordingly, in order to obtain accurate dimensions between the cam disks and the shaft end members and between the two shaft end members, it is necessary to carry out dimensional adjustments of the shaft end part of the hollow shaft after the bulging process and before the attachment of the shaft end members.

Another problem encountered heretofore is that, when the shaft end members are attached to the ends of the hollow shaft by a bulging process, it is difficult to obtain a strong joint therebetween. Furthermore, the reliability of the seal between the mutually contacting parts of the hollow shaft and the shaft end members during this attachment is low, and for this reason deviations in the strength of the joints of the shaft end members of the completed built-up camshafts occur and leave uncertainty as to the product quality.

On this point, it is not possible at all to determine from an inspection of the exterior the state of the joint between a hollow shaft and the shaft end members attached thereto, and, moreover, a nondestructive inspection of the state of the joint is difficult. Accordingly, there has been a need for elevating the reliability of the joint strength.

The strength of the joints between the hollow shaft and the shaft end members can be increased by raising the hydraulic pressure in the bulging process, but, because this gives rise to breakage of cam disk, there is a limit to the hydraulic pressure which can be applied. However, with a hydraulic pressure of a low level such as to avoid breakage of the cam disks, the reliability of the joint strength as described above has been deficient.

SUMMARY OF THE INVENTION

It was found that most of the above described problems encountered in the prior art can be solved by a fabrication process wherein a hollow shaft is subjected to a bulging process in a die to expand its diameter, and simultaneously cam disks and shaft end caps are integrally joined to the shaft.

It was also found that the remainder of the problems can be overcome by a process where the hollow shaft is swaged and tube expanded in the axial direction to temporarily fix the shaft end caps thereto, and thereafter hydraulic pressure is applied into the hollow shaft thereby to positively fix the shaft end caps and the cam disks to the shaft by bulging.

Accordingly to this invention, briefly summarized, there is provided a process for producing built-up camshafts which comprises fitting cam disks on a hollow shaft, fitting shaft end caps over the ends of the hollow shaft, placing the structure thus assembled in a die, and introducing a fluid under pressure into the hollow shaft thereby to subject the same to bulging and expansion of diameter at specific parts thereof and thereby to simultaneously join the cam disks and the shaft end caps integrally to the hollow shaft.

According to this invention, the process may further comprise the step of, after placing the structure assembled as above in a die, compressing the hollow shaft in the axial direction thereof inwardly from the opposite ends thereof thereby to carry out swaging tube expansion of the hollow shaft to place the cam disks and the shaft end caps in a temporarily fixed state, before the step of introducing a fluid under pressure into the hollow shaft as above, thereby to subject the same to bulging and expansion of diameter at specific parts thereof and to increase the joining strength of the cam disks and shaft end caps to the hollow shaft.

DETAILED DESCRIPTION OF THE INVENTION

Figure 1:
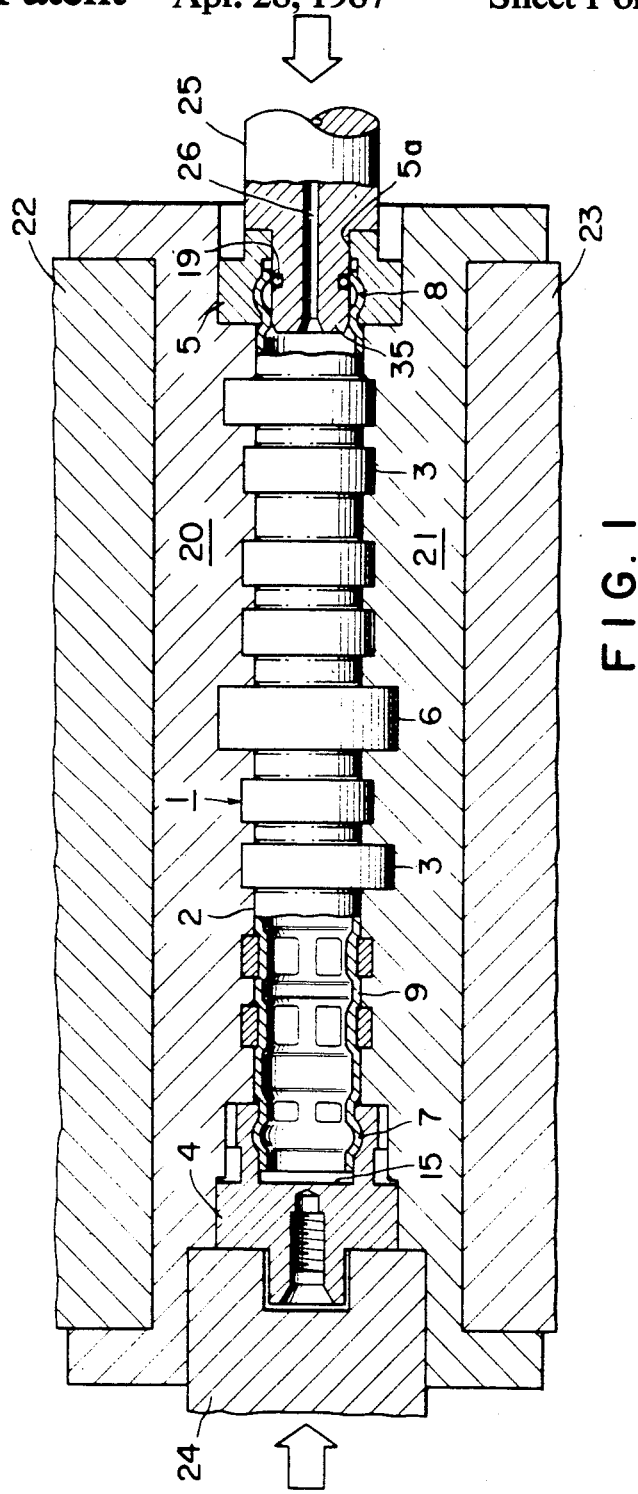
FIG. 1 is a side view, with parts shown in longitudinal section, of a built-up camshaft in a die upon completion of a bulging process.

Referring first to FIG. 1, the essential parts of the example of the built-up camshaft 1 produced according to this invention, shown therein within a bulding die 20, 21, are a hollow shaft 2 of a material such as a steel tube, cam plates or disks 3, shaft end caps 4 and 5, and a journal cylinder 6.

The cam disks 3 have been formed approximately to their desired cam profiles by a process such as casting, forging, or sintering forming and are provided with respective through holes through which the hollow shaft 2 before diameter expansion can be inserted. These through holes are provided with locking means such as a hexagonal shape in cross section for preventing relative rotation between the can disks 3 and the hollow shaft 2 after they have been joined together. The journal cylinder 6 is also provided with such locking means.

Figure 3:
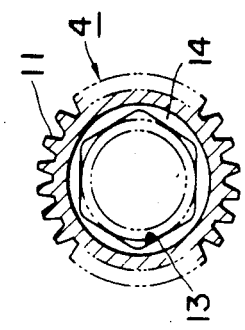
FIG. 3 is a cross section taken along the plane indicated by line III—III in FIG. 2 as viewed in the arrow direction.
Figure 2:
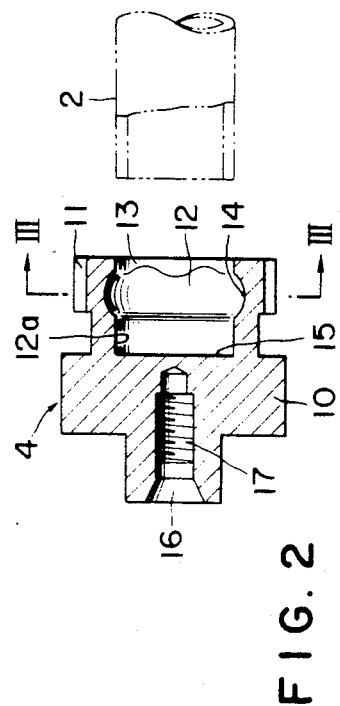
FIG. 2 is a side view, in longitudinal section, of one shaft end cap to be joined to the hollow shaft of the camshaft.

As shown in FIGS. 2 and 3, the shaft end cap 4 comprises essentially a journal part 10 and a gear part 11 integrally and coaxially formed therewith. A centering hole 16 to be used at the time of grinding of the cams 3 and journal 6 is drilled centrally into the journal part 10 from its outer extremity and is tapped with internal screw threads 17. A cylindrical cavity 12 is formed in the gear part 11 and is open at its inner extremity. The shaft end cap 4 is also provided with locking means for preventing rotation relative to the shaft 2 after assembly and joining thereof, which locking means in the instant embodiment is in the form of an entrance part 13 of the cavity 12 of polygonal shape as indicated in FIG. 3. This locking means, however, is not limited to the form illustrated.

An annular concavity or groove 14 is formed around the cylindrical cavity 12 adjacently inward from the entrance part 13 for the purpose of functioning as means for preventing relative translational movement between the shaft end cap 4 and the shaft 2 after assembly and joining thereof. The profile of the annular groove 14 in longitudinal section need not be restricted to an arc of a circle as in the instant embodiment and may be any other suitable shape. The innermost portion 12a of the cavity 12 is cylindrical and of a dimension permitting insertion thereinto of one end of the shaft 2 and terminates at an end wall 15 constituting the bottom surface of the cavity 12.

Figure 4:
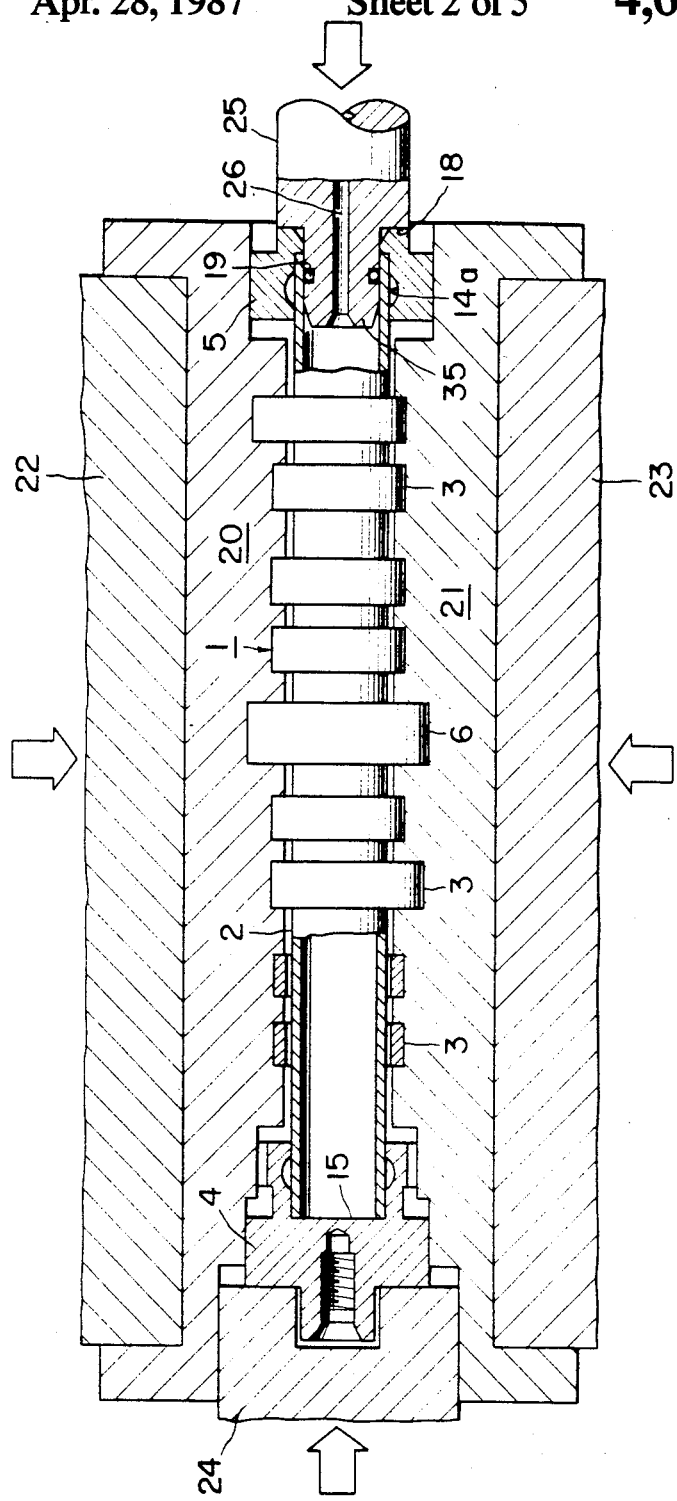
FIG. 4 is a view similar to FIG. 1 but showing the assembled camshaft prior to the bulging process.

The shaft end cap 5 is substantially the same as the above described shaft end cap 4 except that it does not have a gear part and has a central through hole 5a. As shown in FIG. 4, this end cap 5 has an annular groove 14a similar to the annular groove 14 in the end cap 4.

The assembly of the above described built-up camshaft will now be described with reference to FIG. 4. This assembly work is carried out with the above described parts of the camshaft accommodated within a bulging die comprising upper and lower dies 20 and 21, upper and lower die holders 22 and 23 respectively holding and backing up the upper and lower dies, and a shaft end head 24 and a pressure nozzle 25, serving also as a shaft end head, are inserted into milled recesses at opposite ends of the bulging die. The shaft end head 24 and the pressure nozzle 25 are adapted to be pressed toward each other axially of the hollow shaft 2 by hydraulic piston-cylinder mechanisms (not shown) to counter the liquid pressure to be introduced into the interior of the hollow shaft 2 by pressurizing means (also not shown).

The pressure nozzle 25 has a pressure introducing inlet 26 and has an inner small-diameter part 35 and an adjoining outer large-diameter part, a stepped ledge part 18 being formed therebetween. The small-diameter part 35 is inserted into the end of the hollow shaft 2 until the ledge part 18 abuts against the outermost part of the shaft end cap 5. The small-diameter part 35 is provided around its outer periphery with a backing 19.

In assembling the camshaft, first, the cam disks 3 and the journal cylinder 6 are fitted onto the hollow shaft 2 at respectively prescribed positions. Then the shaft end caps 4 and 5 are fitted onto their respective ends of the shaft 2. The parts thus assembled are then placed within the bulging die, and, as indicated by arrows in FIG. 4, forces are applied from four directions to close the die.

At this stage, the shaft end caps 4 and 5 are not yet at their final positions they will assume upon completion of the camshaft. The reason for this is that the hollow shaft 2 is fabricated with a length which is longer by a specific amount than the final length in order to allow for shrinkage of the total length due to the bulging process, and, at the same time, pressing abutment between the shaft end and the aforedescribed bottom surface 15 of the shaft end cap 4 is made possible at the initial period of the bulging process, whereby sealing therebetween is attained.

Then, with the die in the above described closed state, a fluid such as an emulsion is introduced through the inlet 26 of the pressure nozzle 25 and is pressurized by the pressurizing means. As a result, as indicated in FIG. 1, the hollow shaft 2 shrinks in overall length and at the same time expands laterally outward as at 7, 8 and 9, undergoing plastic deformation in conformance with the inner wall surfaces of the cam disks 3, the journal cylinder 6, the shaft end caps 4 and 5, and the die surface of the bulging die 20, 21. Particularly at the inner wall surfaces of the shaft end caps 4 and 5, the hollow shaft 2 is formed into a hexagonal shape as viewed in cross section in conformance with the polygonal part 13 of the end cap 4 and into an annular bulged part 7 of arcuate shape in longitudinal section in conformance with the arcuate groove 14 in the end cap 4.

At this stage, the shaft end caps 4 and 5 are abutting against the end surfaces of the opposed upper and lower dies 20 and 21, and the end surface of the shaft 2 is spaced apart from the bottom surface 15 of the cap 4. All of the cam disks 3, the journal cylinder 6, and the shaft end caps 4 and 5 are thus tightly fixed to the hollow shaft 2.

The resulting structure is them removed from the bulging die, and its cam surfaces and the journal cylinder 6 are subjected to finishing by grinding. Furthermore, drilling of oil holes and other processes are performed, whereupon the desired camshaft 1 is completed.

Various modes of practice and modifications of this invention are possible as illustrated by the examples described below with reference to FIGS. 5 through 10. In these figures, those parts which are the same as or equivalent to corresponding parts in the preceding example shown in FIGS. 1 through 4 are designated by like reference numerals with different subscript letters for respective examples.

Figure 5:
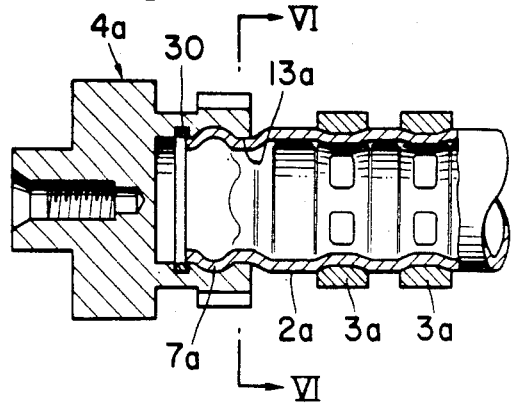
FIG. 5 is a partial side view, in longitudinal section, showing the use of an O-ring to obtain a tight seal between the hollow shaft and a shaft end cap.
Figure 6:
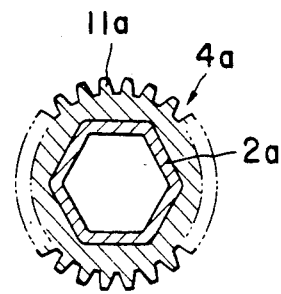
FIG. 6 is a cross section taken along the plane indicated by line VI—VI in FIG. 5 as viewed in the arrow direction.

In the example illustrated in FIGS. 5 and 6, an annular O-ring groove is formed at a suitable position in the inner wall surface of the cylindrical cavity in the shaft end cap 4a, and an O-ring 30 is fitted in this groove. By this provision, the sealing effectiveness at the contacting parts of the outer periphery of the hollow shaft 2a and the O-ring 30 is increased during the initial stage of the bulging process, whereby the forming of the annular bulged part 7a is aided.

As will be apparent from the above described example as well as the following examples, in order to form a polygonal part and an annular bulged part near the end of the hollow shaft within the cylindrical cavity of the shaft end cap of limited space wherein ample length in the axial direction is not available, the seal for the pressurized liquid between the end cap and the hollow shaft in the initial period of the bulging process is disposed at a position nearest the end of the hollow shaft, at least between the extreme end of the shaft and the part thereof to become the annular bulged part.

Figure 7:
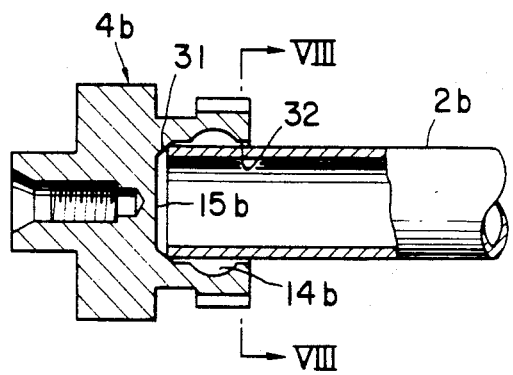
FIG. 7 is a side view similar to FIG. 5 showing another example wherein the sharp outer edge of an end of the hollow shaft abutting against a chamfered surface of the shaft end cap constitutes a tight seal therebetween.
Figure 8:
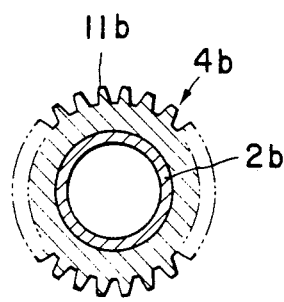
FIG. 8 is a cross section taken along the plane indicated by line VIII—VIII in FIG. 7.

In another example as shown in FIGS. 7 and 8, the juncture between the bottom surface 15b and the innermost cylindrical portion of the cylindrical cavity of the shaft end cap 4b is chamfered to form a concave frustoconical surface 31 prior to bulging, and a line contact seal is obtained between this frustoconical surface 31 and the outer peripheral edge of the end surface of the hollow shaft 2b at the time of the bulging process. Furthermore, the part of the cylindrical cavity in the vicinity of its outer opening is formed as a circular hole 32, and the part of the cap 4b defining this circular hole 32 is brazed to the shaft 2b for reinforcement after the bulging process.

Figure 9:
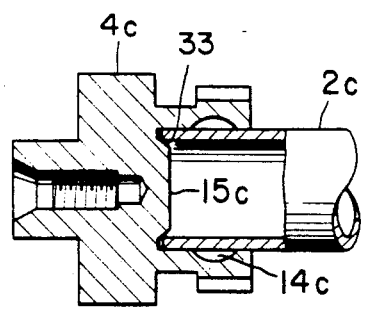
FIG. 9 is a side view similar to FIG. 5 showing another example wherein the sharp inner edge of an end of the hollow shaft abutting against a beveled surface of the shaft end cap constitutes a tight seal therebetween.

An essential feature of the example shown in FIG. 9 is that, prior to the bulging process, the bottom surface 15c of the cylindrical cavity in the shaft end cap 4c is provided therearound with a beveled edge, whereby a convex frustoconical surface 33 is formed, and, at the time of the bulging process, the inner edge of the end face of the hollow shaft 2c abuts against this frustoconical surface 33 to produce a line-contact seal therebetween.

Figure 10:
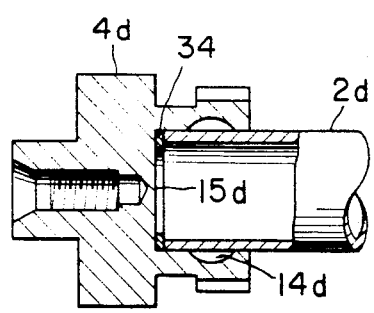
FIG. 10 is a side view also similar to FIG. 5 showing still another example wherein a copper packing is used to form a tight seal between the hollow shaft and a shaft end cap.

In the example illustrated in FIG. 10, a copper gasket or packing 34 is interposed between the bottom surface 15d of the cylindrical cavity in the shaft end cap 4d and the end face of the hollow shaft 2d before the bulging process. As a result, a highly effective seal is obtained at the time of the bulging process.

In other respects, the process of assembling and joining the various parts of each of the built-up camshafts of the examples described above with reference to FIGS. 5 through 10 is the same as that in the first example.

Figure 11:
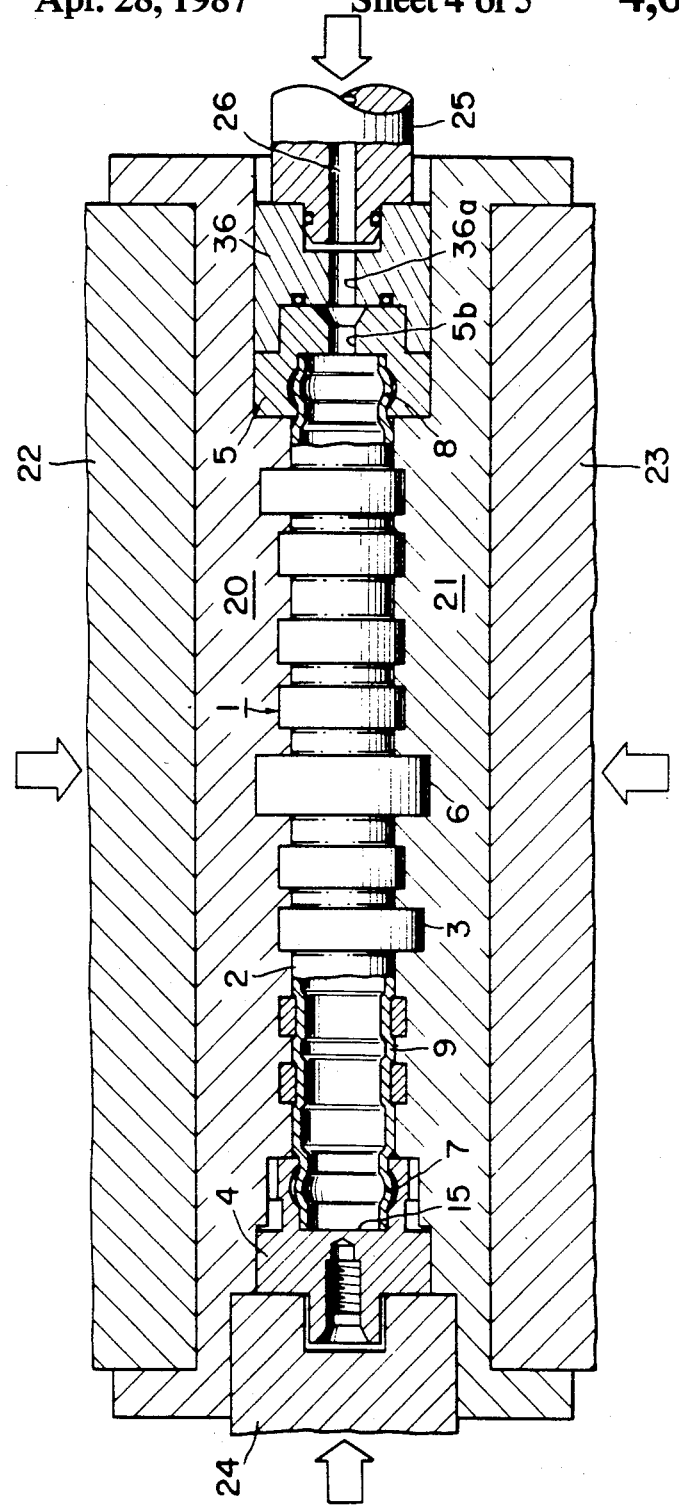
FIG. 11 is a side view similar to FIG. 1 showing another example of the built-up camshaft of the invention.
Figure 12:
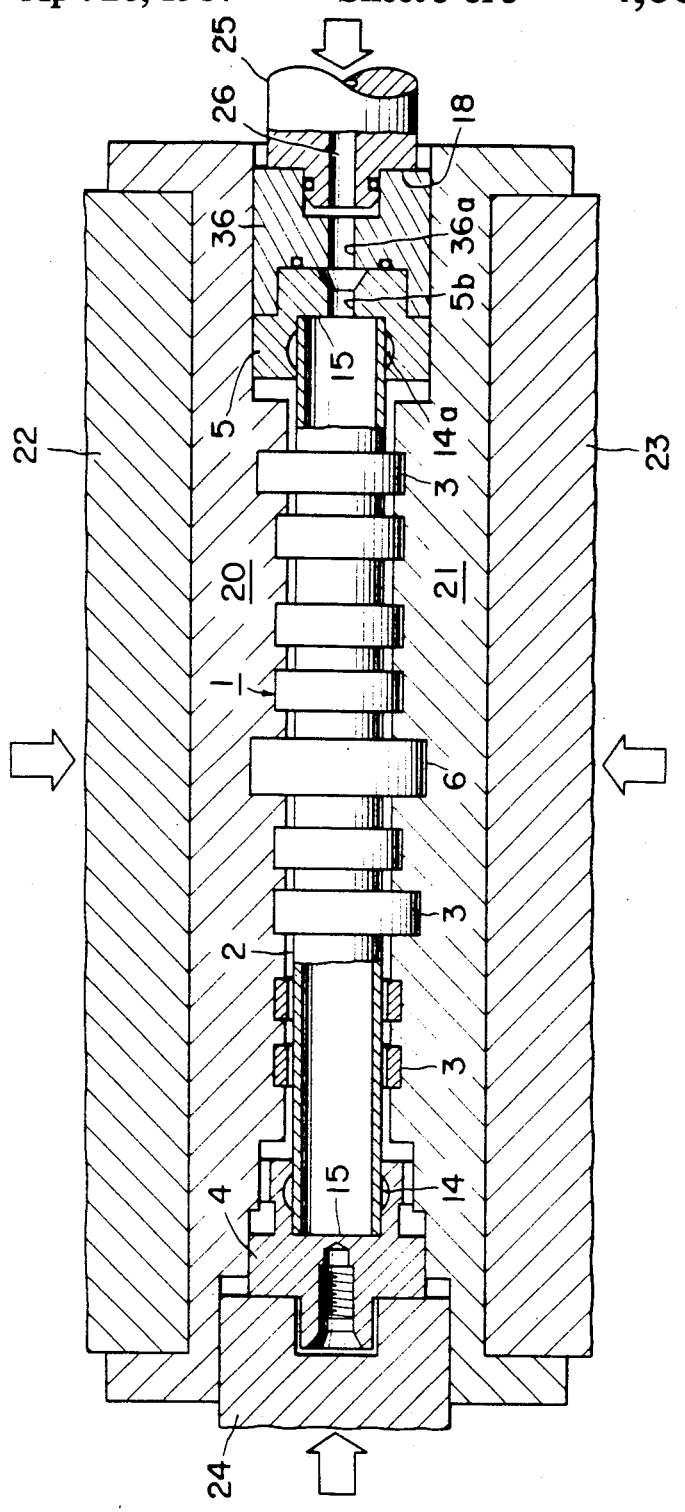
FIG. 12 is a side view similar to FIG. 4 showing parts of a camshaft assembled and placed in a bulging die, which has then been closed.

In still another embodiment of the invention as shown in FIGS. 11 and 12, a coupler 36 having an axial through hole 36a is interposed between the pressure nozzle 25 and the shaft end cap 5 having an axial through hole 5b. The shaft end head 24 and the pressure nozzle 25, functioning doubly as the opposite shaft end head, are adapted to be pressed in opposite directions against the shaft end caps 4 and 5 by hydraulic piston-cylinder mechanisms (not shown) to counter the liquid pressure to be introduced into the interior of the hollow shaft 2 by pressurizing means (also not shown) as in the first embodiment described hereinbefore.

The hollow shaft 2, the cam disks 3, the journal cylinder 6, and the shaft end caps 4 and 5 are assembled and placed together with the coupler 36 in the bulging die 20, 21, which is then closed as shown in FIG. 12.

Then the shaft end head 24 and the pressure nozzle 25 are simultaneously pressed in the directions to compress the hollow shaft 2 until they reach positions of FIG. 11 where they are stopped by the upper and lower dies 20 and 21, thereby carrying out so-called swaging tube expansion.

By this swaging tube expansion, specific parts of the hollow shaft 2 are bulged outward, and the cam disks 3, the journal cylinder 6, and the shaft end caps 4 and 5 are temporarily fixed. At the same instant, the ends of the hollow shaft 2 assume a state wherein they are abutting with great force against the bottom surfaces 15, 15 of the cylindrical cavities 12, 12 of the opposed shaft end caps 4 and 5, and by which the overall length of the built-up camshaft 1 is determined.

Then, with the die and its contents in this state wherein the pressing force for closing the die and the pressing force for swaging are sustained, a working fluid such as an emulsion is introduced into the interior of the hollow shaft 2 in the same manner as in the aforedescribed embodiment, and this emulsion is then pressurized to carry out a so-called bulging process. As a result, the hollow shaft 2 is expanded in diameter at all parts thereof which can be thus expanded as shown in FIG. 11, and the connections of the cam disks 3, the journal cylinder, and the shaft end caps 4 and 5 are strengthened.

The contraction of the overall length of the hollow shaft 2 due to this bulging process is very small in comparison with that in the case wherein swaging tube expansion is not carried out preliminarily. The reason for this may be considered to be that the parts of the hollow shaft protrudingly expanded outward at the side faces of the disks 3 by the swaging tube expansion engage the edges of the openings in the disks 3 and the shaft end caps 4 and 5 at the time of the bulging process thereby to resist the contraction of the total length of the hollow shaft 2. It may be further considered that, as a result of the reduction in the contraction of the hollow shaft 2 in this manner, the outward expansion of the hollow shaft 2 into the annular grooves 14 has become more positive.

As a total result, the cam disks, the journal cylinder, and the shaft end caps are securely fixed to the hollow shaft.

By the practice of the process of this invention as described above, irregularities or deviations of the overall length of the hollow shaft with every instance of bulging process and deviations of the interval dimensions between the hollow shaft ends and the cam disks adjacent to the shaft ends with every instant of bulging process are eliminated, and the shaft end members can be securely fixed to the hollow shaft at prescribed positions with a high degree of precision. Moreover, the efficiency of producing built-up camshafts is greatly increased.

Furthermore, by the practice of this invention, when the hollow shafts come into abutting contact with the inner wall surfaces of the cam disks as the swaging tube expansion of the hollow shaft progresses, the deformation of the axial ends of the hollow shaft on which the shaft end members are fitted progresses remarkably, and it becomes possible to cause the hollow shaft ends, which are difficult to form into a desired shape because of their high resistance to forming by fluid pressurizing, to conform substantially to the inner wall surfaces of the shaft end members.

Still another advantageous feature of this invention is that, as a result of the swaging tube expansion of the hollow shaft, the elastic force of the follow shaft also is applied at the mutually contacting parts of the hollow shaft ends and the shaft end members, and the sealing therebetween can be made complete, whereby, in the joining of the parts of the built-up camshaft, the shaft end members can be securely joined to the hollow shaft without undue force even when the applied hydraulic pressure force is lowered. Moreover, a high joint strength with little deviation can be attained.

What is claimed is:

1. A process for producing built-up camshafts, comprising the steps of fitting cam disks on a hollow shaft, fitting shaft end caps over the ends of the hollow shaft, placing the structure thus assembled in a die, and introducing a fluid under pressure into the hollow shaft thereby to subject the same to bulging and expansion of diameter at specific parts thereof and thereby to simultaneously join the cam disks and the shaft end caps integrally to the hollow shaft.

2. A process for producing built-up camshafts as set forth in claim 1 wherein each of the shaft end caps has a cavity into which each end of the hollow shaft is fitted.

3. A process for producing built-up camshafts as set forth in claim 2 wherein the cavity of each shaft end cap has an annular groove in the inner surface thereof, and the hollow shaft is expanded laterally outward into the annular groove when the fluid under pressure is introduced into the hollow shaft.

4. A process for producing built-up camshafts as set forth in claim 2 wherein the entrance part of the cavity of each shaft end cap has a polygonal shape in cross section, and, when the fluid under pressure is introduced into the hollow shaft, it is expanded into conformity with the polygonal shape and locked with each shaft end cap.

5. A process for producing built-up camshafts as set forth in claim 1 wherein one of the shaft end caps has a central through hole into which a pressure nozzle is tightly fitted to introduce the fluid under pressure therethrough into the hollow shaft.

6. A process for producing built-up camshafts as set forth in claim 5 wherein the shaft end caps and the pressure nozzle are pressed inward toward the die while the fluid under pressure is introduced into the hollow shaft.

7. A process for producing built-up camshafts as set forth in claim 2 wherein the cavity of at least one of the shaft end caps has a sealing ring fitted in the inner surface thereof for sealing contact with the end of the hollow shaft.

8. A process for producing built-up camshafts as set forth in claim 2 wherein the bottom surface of the cavity of at least one of the shaft end caps has a concave frustoconical surface for sealing contact with the end of the hollow shaft.

9. A process for producing built-up camshafts as set forth in claim 2 wherein the bottom surface of the cavity of at least one of the shaft end caps has a convex frustoconical surface for sealing contact with the end of the hollow shaft.

10. A process for producing built-up camshafts as set forth in claim 2 wherein a packing is interposed between the bottom surface of the cavity of at least one of the shaft end caps and the end face of the hollow shaft before the bulging process.

11. A process for producing built-up camshafts, comprising the steps of fitting cam disks on a hollow shaft, fitting shaft end caps over the ends of the hollow shaft, placing the structure thus assembled in a die, compressing the hollow shaft in the axial direction thereof inwardly from the opposite ends thereof thereby to carry out swaging tube expansion of the hollow shaft to place the cam disks and the shaft end caps in a temporarily fixed state, and introducing a fluid under pressure into the hollow shaft thereby to subject the same to bulging and expansion of diameter at specific parts thereof and to increase the joining strength of the cam disks and shaft end caps to the hollow shaft.

12. A process for producing built-up camshafts as set forth in claim 11 wherein one of the shaft end caps has an axial through hole, a coupler having an axial through hole is placed axially outward of the one shaft end cap, and a pressure nozzle is then placed axially outward of the coupler, and wherein the hollow shaft is subjected to the swaging tube expansion by forcing the pressure nozzle against the one shaft end cap via the coupler axially toward the hollow shaft and by forcing, at the same time, the other shaft end cap axially toward the hollow shaft.

* * * * *